United States Patent [19]
Johnston

[11] Patent Number: 5,735,666
[45] Date of Patent: Apr. 7, 1998

[54] SYSTEM AND METHOD OF CONTROLLING THRUST FORCES ON A THRUST BEARING IN A ROTATING STRUCTURE OF A GAS TURBINE ENGINE

[75] Inventor: Richard P. Johnston, Cincinnati, Ohio

[73] Assignee: General Electric Company, Cincinnati, Ohio

[21] Appl. No.: 775,650

[22] Filed: Dec. 31, 1996

[51] Int. Cl.⁶ ........................................ F01D 3/04
[52] U.S. Cl. .................. 415/34; 415/104; 415/105; 384/448; 384/517; 384/624
[58] Field of Search .................. 415/1, 30, 33–34, 415/13, 96, 104, 105, 106, 107, 229; 384/446, 448, 517, 556, 624

[56] References Cited

U.S. PATENT DOCUMENTS

| | | | |
|---|---|---|---|
| 4,578,018 | 3/1986 | Pope | 415/104 |
| 4,907,943 | 3/1990 | Kelch | 415/104 |
| 5,102,295 | 4/1992 | Pope | 415/104 |
| 5,248,239 | 9/1993 | Andrews | 415/104 |

FOREIGN PATENT DOCUMENTS

| | | | |
|---|---|---|---|
| 1435842 | 11/1988 | U.S.S.R. | 415/107 |
| 2111136 | 6/1983 | United Kingdom | 384/448 |

*Primary Examiner*—Christoper Verdier
*Attorney, Agent, or Firm*—Andrew C. Hess; Patrick R. Scanlon

[57] ABSTRACT

A system for controlling thrust forces on a thrust bearing in a rotating structure of a gas turbine engine at designated operating points including a device for providing thrust load compensation to the thrust bearing, a control for operating the thrust load compensation device, and a sensor for detecting rotational cage speed of the thrust bearing. The sensor provides a signal to the control when the rotational cage speed of the thrust bearing drops below a specified ratio of the rotational speed for the rotating structure, the signal being indicative of an incipient skid condition for the thrust bearing. The control then causes the thrust load compensation device to provide an additional predetermined load on the thrust bearing when it receives the signal from the sensor so that a resultant load thereon is within a specified load range which extends the life of the thrust bearing.

19 Claims, 3 Drawing Sheets

SYSTEM AND METHOD OF CONTROLLING THRUST FORCES ON A THRUST BEARING IN A ROTATING STRUCTURE OF A GAS TURBINE ENGINE

BACKGROUND OF THE INVENTION

1. Field of the Invention

The present invention relates generally to controlling thrust forces on a thrust bearing in a rotating structure of a gas turbine engine and, more particularly, to a system and method which maintains a resultant load on the thrust bearing within a specified load range to increase the life thereof.

2. Description of Related Art

The problem of compensating for thrust forces in a gas turbine engine is well known, particularly with respect to off-loading such thrust forces on ball thrust bearings of rotating structures therein. However, as gas turbine engines develop higher internal pressures and firing temperatures, the problem of unbalanced thrust loads on the independently turning spools becomes even more severe since high speed ball thrust bearings can safely handle relatively small thrust loads. While various thrust offsetting schemes have been utilized to balance the large spool thrust loads out so that a small resultant thrust load remains to be handled by the ball thrust bearing, such schemes have been only partially successful. This lack of acceptable performance stems from fluctuations in thrust loads at various points in the engine caused by variations in seal leakage, as well as performance and even pressure drops through vanes and blades due to variations in stage air flow areas (resulting from manufacturing and assembly tolerances).

Accordingly, there have been significant efforts to find some way to use thrust compensator devices to control the varying resultant thrust loads that are applied to the ball thrust bearings. These efforts have currently been directed toward piston balance systems, where a large rotating seal cavity has an artificially maintained pressure level to exert a compensating thrust on the rotor with the proper direction and magnitude. An example of such a piston balance system is disclosed in U. S. Pat. No. 4,864,810 to Hines. Until recently, these thrust compensating piston balance systems have operated with passively set pressure levels from preselected bleed sources. As engine cycle pressure ratios have increased, the variation in thrust load from passive systems has become too large to be safely handled by the ball thrust bearings. This is particularly true in the case of industrial gas turbine engines which do not have the fan components of an aircraft gas turbine engine to provide a large balancing forward thrust.

Various schemes have been developed to artificially provide controlled thrust load compensation that maintains the resultant spool thrust load taken out on the ball thrust bearing within very close limits, thereby permitting extremely long bearing lives. An exemplary scheme is disclosed in a patent application entitled "System For Balancing Loads On A Thrust Bearing Of A Gas Turbine Engine Rotor And Process For Calibrating Control Therefor," which was also filed by the assignee of the present invention and has Ser. No. 08/581,784. Nevertheless, a remaining concern is that a minimum thrust load is required by the ball thrust bearings to keep the ball elements thereof rolling properly without slipping or "skidding." Since the load permitted over the skidding load generally is only a few thousand pounds, and raw thrust loads in the gas turbine engine may reach fifty to one hundred tons, a thrust bearing load feedback system must be utilized in order to control the resultant load closely enough.

In light of the foregoing, it is desired that a system and method for controlling the thrust forces on a thrust bearing in a gas turbine engine be developed which provides accurate resultant bearing load indications, as well as maintains the resultant load on the thrust bearing within a specified load range to dramatically increase the life thereof.

SUMMARY OF THE INVENTION

In accordance with one aspect of the present invention, a system for controlling thrust forces on a thrust bearing in a rotating structure of a gas turbine engine is disclosed as including means for providing thrust load compensation to the thrust bearing, a control for operating the thrust load compensation means, and a sensor for detecting rotational cage speed of the thrust bearing. The sensor provides a signal to the control when the rotational cage speed of the thrust bearing drops below a specified ratio of the rotational speed for the rotating structure, the signal being indicative of an incipient skid condition for the thrust bearing. The control then causes the thrust load compensation means to provide an additional predetermined load on the thrust bearing when it receives the signal from the sensor so that a resultant load thereon is within a specified load range which extends the life of the thrust bearing.

In accordance with a second aspect of the present invention, a method of providing compensation for thrust forces on a thrust bearing in a rotating structure of a gas turbine engine at designated operating points thereof is disclosed. This method includes the steps of creating an incipient skid condition for the thrust bearing, detecting the incipient skid condition of the thrust bearing, and applying a predetermined thrust load to the thrust bearing so as to place it within a designated bearing load band of safe operation. The method will also preferably include the step of initially providing an approximate thrust load compensation on the thrust bearing at the designated operating points of the gas turbine engine.

In accordance with a third aspect of the present invention, a method of off-loading thrust forces on a thrust bearing for a rotating structure in a gas turbine engine is disclosed as including the steps of providing an approximate thrust load compensation to the thrust bearing at designated operating points of the gas turbine engine, reducing the thrust load to the thrust bearing in order to create an incipient skid condition for the thrust bearing, sensing a rotational cage speed of the thrust bearing, providing a signal when the rotational cage speed of the thrust bearing slows by a specified amount relative to a rotational speed of said rotating structure, and applying an additional predetermined load to the thrust bearing in response to the signal so as to create a resultant load thereon within a designated bearing load band.

BRIEF DESCRIPTION OF THE DRAWINGS

While the specification concludes with claims particularly pointing out and distinctly claiming the present invention, it is believed the same will be better understood from the following description taken in conjunction with the accompanying drawings in which:

DETAILED DESCRIPTION OF THE INVENTION

Figure 1:
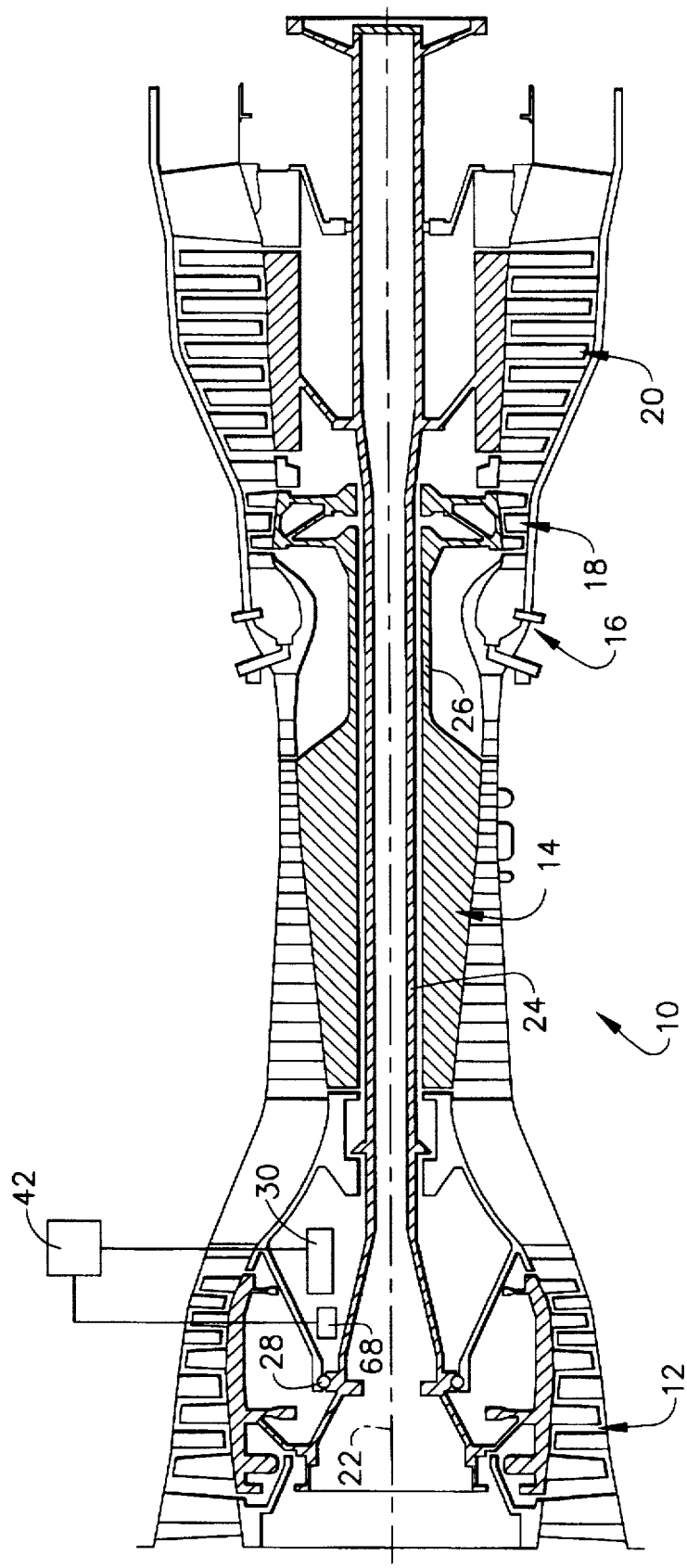
FIG. 1 is a longitudinal cross-sectional view of a gas turbine engine including a thrust bearing and a thrust load compensation system for controlling thrust forces thereon in accordance with the present invention.

Referring now to the drawings in detail, wherein identical numerals indicate the same elements throughout the figures, FIG. 1 depicts an aeroderivative gas turbine engine 10 of the type having a low pressure compressor 12, a high pressure compressor 14 downstream of low pressure compressor 12, a combustor 16 downstream of high pressure compressor 14, a high pressure turbine 18 downstream of combustor 16, and a low pressure turbine 20 downstream of high pressure turbine 18. The elements of gas turbine engine 10 rotate about a longitudinal axis 22. The standard configuration for engines of this type is a dual concentric shafting arrangement, whereby low pressure turbine 20 is drivingly connected to low pressure compressor 12 by a first shaft 24 and high pressure turbine 18 is similarly drivingly connected to high pressure compressor 14 by a second shaft 26 external and concentric to shaft 24. In the gas turbine engine depicted in FIG. 1, low pressure turbine 20 is connected directly to low pressure compressor 12 and a load (not shown) at a downstream end. An example of such an engine is manufactured by General Electric Company of Evendale, Ohio under the designation LM6000.

As discussed above, certain thrust forces are produced within gas turbine engine 10 which act axially at different points or portions in engine 10. While a compressor driven by a turbine can compensate to some degree for a net axially downstream force in the turbine (such as the case with low pressure compressor 12 and low pressure turbine 20), a thrust bearing, as designated generally by the numeral 28, is normally required in order to fully absorb the thrust forces produced by low pressure turbine 20 and axially position the low pressure rotating system. In order to limit the amount of net axial force imposed on thrust bearing 28, a thrust load compensation system generally indicated by the numeral 30 is utilized to balance such thrust loads thereon. While thrust load compensation system 30 operates magnetically, as seen in FIG. 2, it will be understood that it may alternatively operate pneumatically or hydraulically.

More specifically, thrust load compensation system 30 preferably includes a plurality of static members 32 positioned along a support member 34 of a support cone 36. It will be noted that static members 32 house one or more aft-facing magnets 38 therein which may be energized with voltage via a cable 40 connected to a power source (not shown) activated by a control mechanism 42. Adjacent each static member 32 is a corresponding rotating disk member 44 where rotating disk members 44 are collectively joined to first shaft 24 at a downstream end and a bumper bearing 46 at an upstream end. Those skilled in the art will appreciate that magnets 38 are energized to produce magnetic fields which then pull rotating disk members 44. In this way, first shaft 24 is pulled toward the forward end of gas turbine engine 10 according to the strength of the magnetic fields produced by magnets 38. It will also be seen that an aft static member 48 preferably is provided which includes one or more forward-facing magnets 50 therein so that a magnetic field produced thereby pulls an aft rotating disk member 52 toward the aft end of gas turbine engine 10. This is used to properly load up thrust bearing 28 during start-up of gas turbine engine 10.

Figure 2:
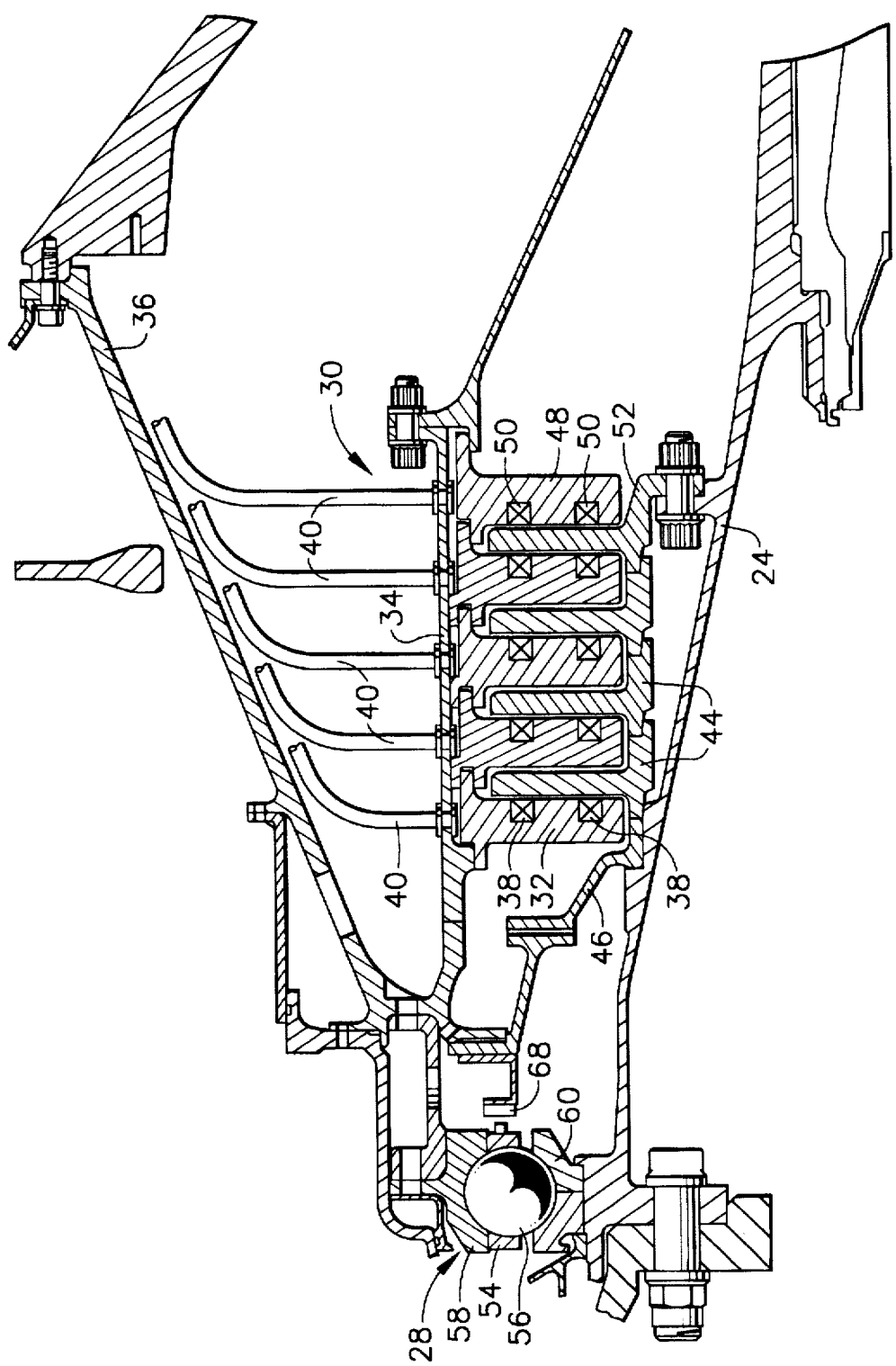
FIG. 2 is an enlarged, partial cross-sectional view of the thrust bearing and the thrust load compensation system depicted in FIG. 1.

It will be seen in FIG. 2 that thrust bearing 28 includes a cage 54 which spins in conjunction with a rolling element 56. Rolling element 56 is positioned within an outer race 58 connected to support cone 36 and a split inner race 60 connected to first shaft 24. With respect to the interaction of thrust bearing 28 and thrust load compensation system 30, it will be understood that magnets 38 within static members 32 are utilized to either "lift" (i.e., reduce) some of the spool load on thrust bearing 28 or "drop" (i.e., permit) some of the spool load back to first shaft 24 and therefore thrust bearing 28.

Figure 3:
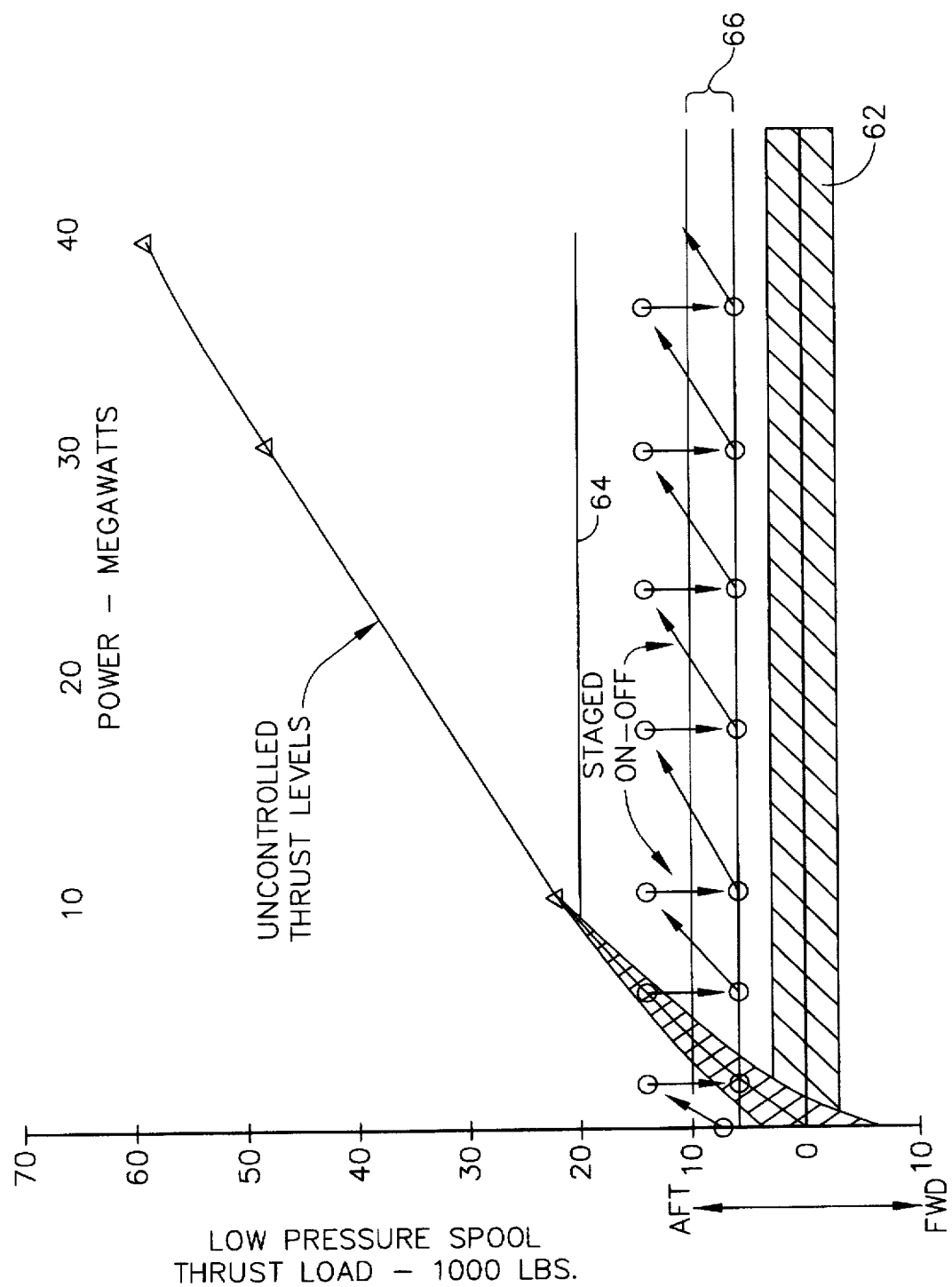
FIG. 3 is a graph depicting the various constraints on the thrust load compensation system of FIGS. 1 and 2 for an exemplary low pressure spool of a gas turbine engine.

In FIG. 3, a graph depicting an uncompensated thrust level as a function of output power (in Megawatts) is depicted with respect to the LM6000 gas turbine engine identified hereinabove. It will be seen therefrom that a load range (identified by cross-hatched area 62) exists at which rolling element 56 of thrust bearing 28 skids or does not roll properly. For the case shown, skid load range 62 extends from approximately −3000 to +3000 pounds of axial thrust. A safe momentary load limit 64 (i.e., 20,000 pounds of thrust) is depicted for thrust bearing 28 which cannot be exceeded without putting undue stress thereon. Accordingly, it has been found that a preferred load zone 66 (e.g., 3000–10,000 pounds of axial load) for thrust bearing 28 exists (immediately above skid load range 62 and below safe momentary load limit 64) at which the life of thrust bearing 28 is safely maximized. This degree of precision is required by thrust load compensation system 30 for all engines regardless of seal, assembly or manufacturing tolerances.

It will be understood that thrust load compensation system 30 includes a pre-programmed schedule in control mechanism 42 thereof in order to provide a rough thrust load compensation level at designated operating points of gas turbine engine 10. As noted previously herein, the raw thrust loads of gas turbine engines today may reach 50–100 tons; thus, some type of feedback method is needed to fine tune the axial loads placed on thrust bearing 28 to maintain it within safe long life load zone 66. This is accomplished in accordance with the present invention by providing a sensor 68 which continuously monitors the rotational speed of thrust bearing cage 54 (which spins in conjunction with rolling element 56).

More specifically, it is a well known phenomena that cage 54 slows down when thrust bearing 28 begins to skid. Since the ratio of cage speed to rotor speed is precisely specified (e.g., 51–52%) for when rolling element 56 is sufficiently loaded to not skid, an incipient skid condition is easily detected when the rotational speed of cage 54 drops below the specified ratio to the rotational speed of the rotor. By monitoring the cage speed via sensor 68, and providing a signal to control mechanism 42 when an incipient skid condition is detected, control mechanism 42 can then activate thrust load compensation system 30 to provide a compensating load (i.e., drop the spool load) on thrust bearing 28 so that the resultant load thereon is within safe long life load zone 66. Such compensating load is preferably predetermined and preset at an amount substantially equivalent to the minimum load or low end of safe long life load zone 66 (approximately 3000 pounds for the LM6000 gas turbine engine) in order to provide some margin of error.

It will be appreciated that cage speed sensors are reliable and are much less sensitive to engine operating conditions than thermocouples or strain gages. They are simple in operation and usually depend upon a capacitive or magnetic "spot" pick up to function. While a capacitive or electromagnetic sensor is preferred from the standpoints of reliability and cost, other types of sensors (e.g., a pyrometer or a photocell system) may be utilized.

In order to maintain the load on thrust bearing 28 within safe long life load zone 66, it is imperative for control mechanism 42 to adjust thrust load compensation system 30 when the power of gas turbine engine 10 is altered (as indicated by the staged on-off operating points in FIG. 3). Control mechanism 42 and thrust load compensation system 30 therefore operate in the following manner, where the first step in the process is to preferably have thrust load compensation system 30 provide an approximate thrust load compensation according to a pre-programmed schedule therein. After obtaining this rough thrust load compensation level and the engine has settled into a geometric and thermal steady state, thrust load compensation system 30 reduces the thrust load on thrust bearing 28 to lift the spool load therefrom and create an incipient skid condition therefor. By continuously sensing the rotational speed of cage 54, it can be determined when such cage speed slows by a specified amount relative to the rotational speed of the rotor and therefore when the incipient skid condition has occurred. Sensor 68 then provides a signal to control mechanism 42 to provide an additional predetermined load back onto thrust bearing 28. In this way, thrust bearing 28 runs at the incipient skid load level plus the additional predetermined load so that the resultant load on thrust bearing 28 stays indefinitely within safe long life load zone 66 until another power change in gas turbine engine 10 takes place.

It will be seen that the system and method of controlling thrust forces on a thrust bearing in a rotating structure of a gas turbine engine described herein will allow for engine-to-engine fluctuations and deterioration effects in an engine model line. It will also allow for minor changes in performance, pressure, etc. as long as the ability of thrust load compensation system 30 to apply compensating axial thrust is not exceeded. By sensing operation of thrust bearing 28 directly through the rotational speed of cage 54, any uncertainty regarding actual bearing load is eliminated.

Having shown and described the preferred embodiment of the present invention, further adaptations of the system and method for controlling thrust forces on a thrust bearing in a rotating structure of a gas turbine engine can be accomplished by appropriate modifications by one of ordinary skill in the art without departing from the scope of the invention. For example, it will be understood that various types of thrust load compensation systems, as well as cage speed sensors, may be utilized other than those specifically indicated herein. It will be further understood that while the present invention was described herein with respect to a low pressure sharing arrangement, the system and method of controlling thrust forces on a thrust bearing may be utilized with any rotating shaft system where excess bearing thrust loads may be encountered.

What is claimed is:

1. A system for controlling thrust forces on a thrust bearing in a rotating structure of a gas turbine engine, comprising:

(a) means for providing thrust load compensation to said thrust bearing;

(b) a control for operating said thrust load compensation means; and (c) a sensor for detecting rotational cage speed of said thrust bearing, said sensor providing a signal to said control when a ratio of said rotational cage speed to a rotational speed of said rotating structure falls below a specified amount;

wherein said control causes said thrust load compensation means to provide an additional predetermined load on said thrust bearing so that a resultant load thereon is within a specified load range.

2. The thrust control system of claim 1, wherein said signal from said sensor to said control is indicative of an incipient skid condition for said thrust bearing.

3. The thrust control system of claim 2, wherein said thrust load compensation means is utilized to reduce thrust loads on said thrust bearing at designated operating points of said gas turbine engine in order to create said incipient skid condition.

4. The thrust control system of claim 2, said specified load range comprising a minimum load greater than a load at which said incipient skid condition of said thrust bearing is created and a maximum load less than a safe momentary load.

5. The thrust control system of claim 4, said specified load range further comprising a safe long life zone for said thrust bearing.

6. The thrust control system of claim 1, wherein a schedule is preprogrammed in said control so as to provide an approximate thrust load compensation on said thrust bearing at designated operating points of the gas turbine engine.

7. The thrust control system of claim 1, wherein said specified amount of said ratio of said rotational cage speed to said rotational speed of said rotating structure is representative of when said thrust bearing is sufficiently loaded so as not to skid.

8. The thrust control system of claim 1, wherein said thrust load compensation means operates magnetically.

9. The thrust control system of claim 1, wherein said thrust load compensation means operates pneumatically.

10. The thrust control system of claim 1, wherein said thrust load compensation means operates hydraulically.

11. A method of providing compensation for thrust forces on a thrust bearing in a rotating structure of a gas turbine engine at designated operating points thereof, comprising the following steps:

(a) creating an incipient skid condition for said thrust bearing;

(b) detecting said incipient skid condition of said thrust bearing; and (c) applying a predetermined load to said thrust bearing so as to create a resultant load thereon within a designated bearing load band.

12. The method of claim 11, wherein said incipient skid condition of said thrust bearing is created by reducing thrust loads on said thrust bearing.

13. The method of claim 11, wherein said incipient skid condition is detected by sensing when a rotational cage speed of said thrust bearing slows by a specified amount relative to a rotational speed of said rotating structure.

14. The method of claim 13, wherein a ratio of said rotational cage speed of said thrust bearing to said rotational speed of said rotating structure is set as a specified amount when said thrust bearing is sufficiently loaded not to skid.

15. The method of claim 11, wherein said designated bearing load band is a range of safe bearing loads on said thrust bearing greater than a load at which said incipient skid condition is created.

16. The method of claim 11, further comprising the step of initially providing an approximate thrust load compensation on said thrust bearing at said designated operating points of said gas turbine engine.

17. A method of off-loading thrust forces on a thrust bearing for a rotating structure in a gas turbine engine, comprising the following steps:

(a) providing an approximate thrust load compensation to said thrust bearing at designated operating points of said gas turbine engine;

(b) reducing the thrust load on said thrust bearing in order to create an incipient skid condition for said thrust bearing;

(c) continuously sensing a rotational cage speed of said thrust bearing;

(d) providing a signal indicative of said incipient skid condition when said rotational cage speed of said thrust bearing slows by a specified mount relative to a rotational speed of said rotating structure; and (e) applying an additional predetermined load to said thrust bearing in response to said signal so as to create a resultant load thereon within a designated bearing load band.

18. The method of claim 17, wherein said designated bearing load band is a range of safe bearing loads on said thrust bearing greater than a load at which said incipient skid condition is created, whereby the life of said thrust bearing is increased.

19. The method of claim 17, wherein a ratio of said rotational cage speed of said thrust bearing to said rotational speed of said rotating structure is set as a specified amount when said thrust bearing is sufficiently loaded not to skid.

* * * * *